Nov. 23, 1954     F. H. ANDRIX     2,695,143
HELICOPTER ROTOR ATTITUDE INDICATING INSTRUMENT
Filed Nov. 21, 1950     2 Sheets-Sheet 1
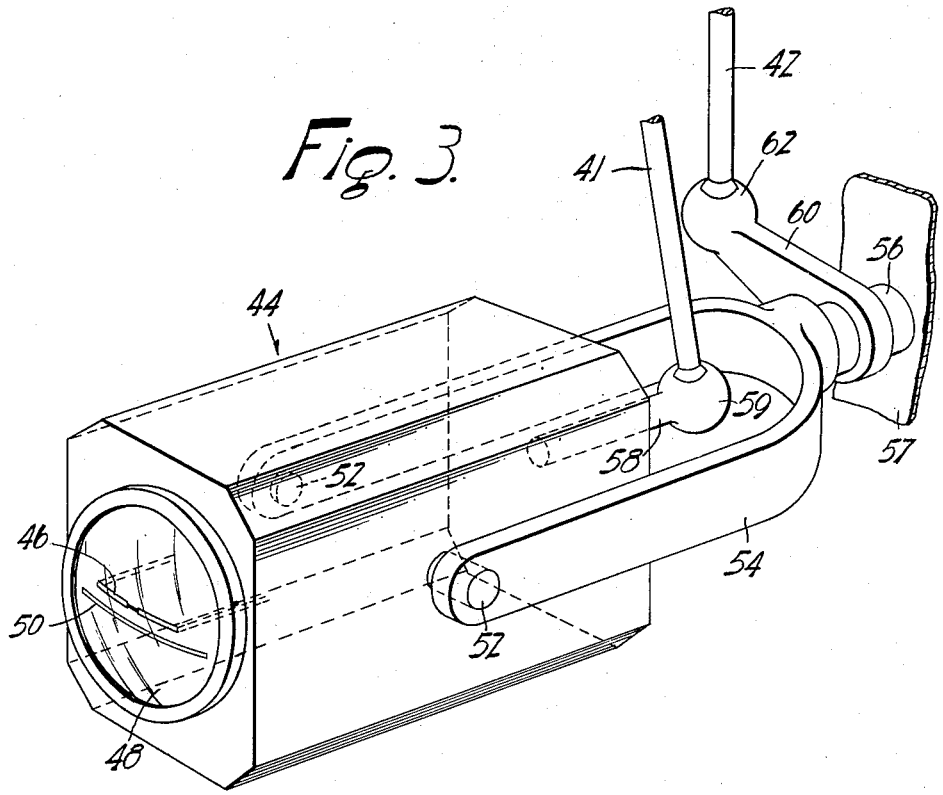
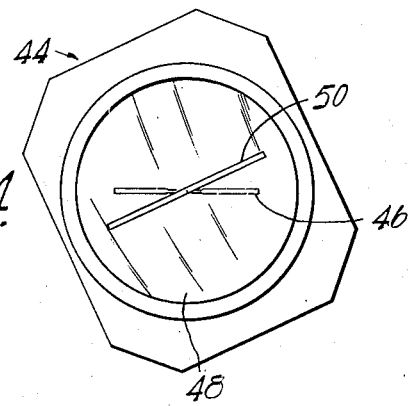
INVENTOR.
Frank H. Andrix
BY
Bean, Brooks, Buckley & Bean
ATTORNEYS Nov. 23, 1954 — F. H. ANDRIX — 2,695,143
HELICOPTER ROTOR ATTITUDE INDICATING INSTRUMENT
Filed Nov. 21, 1950 — 2 Sheets-Sheet 2
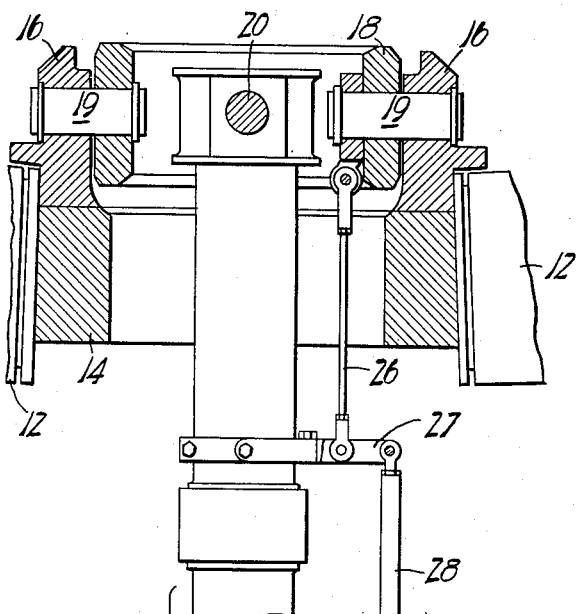
Fig. 1.
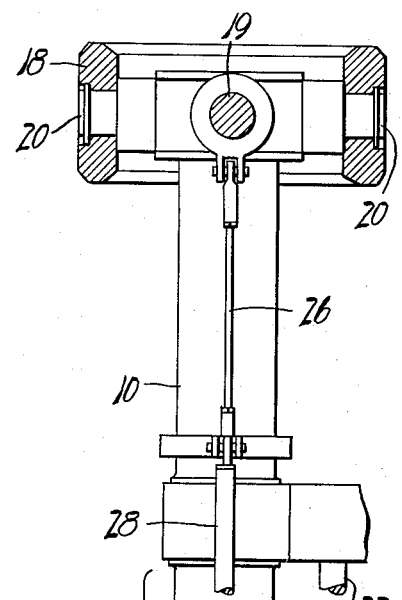
Fig. 2.
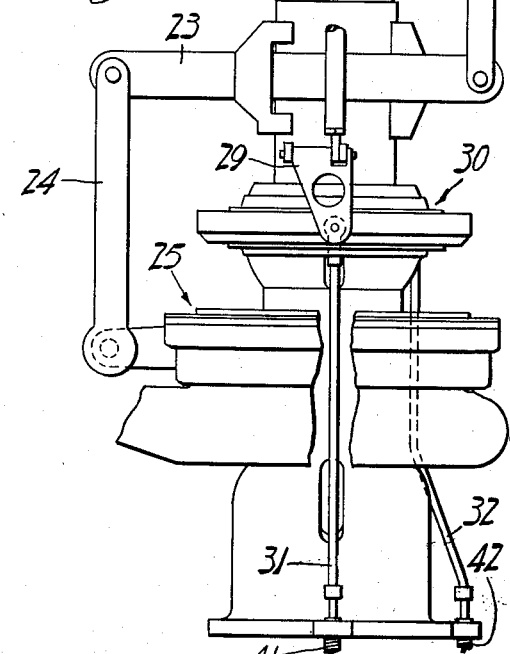
INVENTOR.
Frank H. Andrix
BY Bean, Brooks, Buckley & Bean
ATTORNEYS United States Patent Office 2,695,143
Patented Nov. 23, 1954

2,695,143

HELICOPTER ROTOR ATTITUDE INDICATING INSTRUMENT

Frank H. Andrix, Lockport, N. Y., assignor to Bell Aircraft Corporation, Wheatfield, N. Y.

Application November 21, 1950, Serial No. 196,820

7 Claims. (Cl. 244—17.11)

This invention relates to rotary wing aircraft, and more particularly to instrument flight means in helicopter aircraft or the like.

Whereas, a helicopter type aircraft comprises essentially a main lift rotor and a fuselage or body which suspends pendulously therebelow, flight control effects in such aircraft depend primarily upon the lift rotor disc attitude relative to the horizon and are substantially independent of swinging movements of the fuselage therebelow. More specifically, it is now well known that in any given machine a given rotor disc tilt angle will provide a given stabilized velocity condition. For example, for hovering at zero airspeed the rotor will be disposed essentially level with respect to the horizon, and for every given horizontal flight velocity there is a corresponding rotor disc tilt angle with respect to the horizon; and such functions are entirely independent of the center of gravity position, fuselage pitching moments, and the like. Thus, since any deviation of the rotor attitude relative to the horizon will result in a change of velocity, it is essential that the pilot be instantly furnished with information as to such deviation in order to anticipate the change and correct for it by suitable adjustment of his controls; and the present invention therefore contemplates a flight instrument system which provides the pilot with an anticipatory method of maintaining a desired condition of flight without being distracted by gust factors and the like such as would upset the operation of any conventional flight instrument.

An object of the invention is to provide in helicopter aircraft an improved instrument flight means whereby proper attitude control may be maintained under blind flying conditions.

Another object of the invention is to provide an improved instrument as aforesaid which furnishes to the pilot a visualization of the angle of tilt of the aircraft lift rotor relative to an absolute horizon, in both forward and aft and lateral directions, whereby the mechanism will operate in any weather and will require less maintenance than other devices for the purpose.

Other objects and advantages of the invention will appear from the specification hereinafter.

The present invention contemplates utilization in improved manner of rotor tilt signals together with novel transmission and comparison devices so as to provide to the pilot accurate information at all times as to the rotor attitude. More specifically, the invention contemplates arrangement in a helicopter aircraft or the like of a gyro horizon embodying a fixed horizon representation means and a signal generator responsive to tilting of the rotor disc relative to the horizon which is coupled to a rotor plane representation means for visual comparison purposes to indicate to the pilot the attitude of the rotor disc relative to the horizon independently of the attitude of the fuselage.

In brief, a practical embodiment which the invention may take may include in a helicopter aircraft a swash plate device mounted on the lift rotor shaft for universal tilting thereon; one race thereof being mechanically linked to the rotor to be actuated by flapping thereof, and the other race of the swash plate device being mechanically linked to the case of a standard gyro horizon which is mounted on the aircraft instrument panel by gimbal bearings having roll and pitch axes parallel to the roll and pitch axes of the aircraft. Thus, the mechanical linkage will operate to insure that roll and pitch displacements of the gyro case will be proportional to roll and pitch tilts of the rotor plane relative to the horizon. Suitable indicia fixed to the gyro horizon bar and to the case respectively will then present at all times to the pilot a visual comparison of the rotor attitude to the horizon.

For example, in the drawing:

Fig. 1 is a fragmentary elevation partly in section of a helicopter lift rotor and gyro case control arrangement of the invention;

Fig. 2 is a transverse elevational and sectional view thereof;

Fig. 3 is a perspective view of the gyro case and control means thereof; and

Fig. 4 is an illustration of a typical picturization of a condition of operation, in accord with the invention.

Referring now more specifically to the drawing, the invention is illustrated in connection with a helicopter aircraft including a rotor drive shaft 10 which of course is positionally integral with the fuselage and engine driven as is well known in the art. The lift rotor mounted at the top of the shaft 10 is illustrated to comprise a pair of diametrically opposed blades 12—12 rooted upon a hub 14 but individually rotatable thereon for pitch change purposes. The hub 14 is in turn mounted for universal inclination relative to the mast 10 by means of paired sittups 16—16 pivotally connected to a gimbal ring 18 by means of aligned pivot devices 19—19 having their pivot axes aligned longitudinally of the blades 12—12. In turn the ring 18 is pivotally mounted upon the mast 10 by means of diametrically opposed pivot devices 20 having their pivot axes aligned at right angles to the axes of the pivot devices 19—19; and thus as the shaft 10 rotates the rotor blades are driven to rotate therewith while at the same time the rotor blade tip path plane is universally inclinable relative to the mast. The rotor blades 12 are each provided with actuating horns which connect through links 22, 23 and 24 to a swash plate device 25 which is mounted for universal inclination on the mast 10 whereby the plate 25 may be pilot-controlled as desired to in turn produce cyclic pitch change effects in the blades 12—12 for controlling the plane of rotation of the rotor and to maneuver the aircraft as is well known in the helicopter art.

Thus, it will be appreciated that the rotor system illustrated herein is mounted so that the rotor blade tip path plane is tiltable universally relative to the mast incidental to maneuvering control of the aircraft and/or upsetting disturbances as by wind gusts. In the illustrated form of the apparatus, such tilting of the rotor actuates a push-pull rod 26 which pivotally connects at one end to the rotor and is mounted to extend downwardly along the shaft 10 to rotate therewith, and is connected at its lower end to a lever 27 which in turn connects through a rod 28 and a link 29 to the outer race of a swash plate 30. The inner race of the swash plate 30 is connected by means of a pair of push-pull members 31—32 disposed in longitudinal and transverse plan view alignments respectively with the mast 10 and in turn connecting to the actuating ends of a pair of corresponding flexible push-pull cables 41—42. The bearing support for the swash plate 30 must have incorporated therein a certain amount of friction so as to maintain the plate 30 in any position of tilt as dictated by the push-pull member 26 as it rotates around the shaft 10. Thus, the swash plate 30 is actuated to tilt relative to the mast 10 and in this respect to parallel and follow the rotor plane.

Thus, it will be appreciated that whenever the rotor plane tilts relative to the mast 10 the members 41—42 are displaced proportional to the components of rotor tilt movements in directions parallel to the dispositions of the push-pull members 31—32 about the mast 10. To obtain this effect the push-pull member 31 is disposed in fore and aft alignment with the mast 10 to receive pitch tilt signals from the rod 26, while the push-pull member 32 is disposed in transverse alignment with the mast 10 so as to receive roll tilt signals from the rotor. Thus, the push-pull member 41 will in turn receive pitch tilt signals from the rotor while the push-pull member 42 receives roll tilt signals therefrom.

As shown in Fig. 3, the push-pull members 41—42 are operably connected so as to positionally control the attitude of the external case of a gyro horizon which is designated generally at 44. This gyro may of course be of any desired type and manufacture such as the well known Sperry Gyro Horizon design which is in widespread use today in conventional aircraft to provide direct visual indications of whether the plane is banking, climbing, or diving. Such instruments include internally thereof some form of power driven gyroscope mounted upon gimbals and having extended therefrom a "horizon bar" which maintains a normal attitude representing the relative position of the earth's horizon in spite of pitch and rolling maneuvers of the aircraft. The "horizon bar" referred to is indicated at 46 in Fig. 3 of the drawing and is of course connected to extend rigidly from the gyroscope-stabilized frame (not shown) which is mounted interiorly of the case 44; the bar 46 being disposed in such position as to be clearly visible to the pilot through an opening at the front end of the instrument case which is covered by a cover glass 48. The glass 48 carries a transverse bar-like marking as indicated at 50 for purposes to be explained hereinafter.

Instead of being simply fixed to the cockpit instrument panel of the aircraft as in conventional use of such instruments, the case 44 in accord with the present invention is mounted by means of gimbal devices so as to be universally tiltable relative to its mount in the helicopter fuselage. Thus, for example, as shown in Fig. 3, the instrument case 44 may be carried through a pair of horizontal aligned pivots 52—52 by a yoke 54 which is in turn mounted by means of a rotatable bearing device 56 to extend in cantilever fashion from a fixed support structure 57 which may of course comprise any conveniently available portion of the helicopter frame or instrument panel structure or the like. The bearing 56 is arranged to permit the yoke and instrument case unit to pivot freely about the axis of the bearing 56 which extends horizontally in longitudinal alignment with the instrument case and intersects at right angles the axis of the aligned bearings 52—52 at the geometric center of the gyro instrument carried within the case. The push-pull member 41 is connected to the case 44 as by means of a horn 58 terminating in a ball and socket connection 59 with the push-pull member 41; whereby the member 41 is arranged to rock the instrument case about the axis of the bearings 52—52. A horn 60 keyed to the hub shaft of the yoke 54 terminates in a ball and socket connection 62 with the push-pull member 42; and thus it will be appreciated that actuation of the push-pull member 42 will procure rolling movements of the yoke and instrument case unit about the axis of the bearing 56.

Thus, it will be appreciated that whenever the rotor plane tilts with any component of tilt movement about the pitch axis of the aircraft, the push-pull linkage system will be thereby actuated so as to rock the instrument case 44 about the axis of the bearings 52—52; and thus the bar 50 carried by the case glass will be caused to rise or fall relative to the position of the horizon bar 46 as viewed through the glass in direct proportion to the degree of tilting of the rotor plane about the pitch axis of the aircraft. Similarly, any component of rotor plane tilt about the roll axis of the aircraft will be instantaneously reflected in actuation of the push-pull system so as to cause the push-pull member 42 to rotate the instrument case 44 about the axis of the bearing 56, thereby causing the instrument case to roll in direct proportion to the degree of roll of the rotor plane; whereby the bar 50 on the instrument cover glass will appear to roll relative to the horizon bar 46 as viewed through the glass (Fig. 4).

Thus, the pilot will be given constant visual comparison of the attitude of the rotor plane in pitch and roll relative to the absolute horizon as represented by the bar 46 which is at all times stabilized by the gyroscope mechanism interiorly of the case 44 as is well known in the art. It is of course a particular feature of the present invention that the pilot is provided with direct visual comparisons of the rotor plane attitude relative to the absolute horizon irrespective of the attitude of the helicopter fuselage; any tilting of the aircraft fuselage being automatically compensated for by corresponding displacements of the instrument case control link systems. As explained hereinabove, it is information concerning the attitude of the rotor plane to the earth's horizon that is required by the pilot in order to effect proper control of a helicopter aircraft in connection with blind flying operations; and it will be appreciated that the present invention provides a novel instrument for that purpose.

It will of course be understood that whereas the mechanism illustrated and described herein for transmitting the rotor tilt movements to the gyro case are of the mechanical linkage type, any other suitable means such as an electrical transmission system may be employed in lieu thereof.

Therefore, although only one form of the invention has been shown and described in detail, it will be apparent to those skilled in the art that the invention is not so limited but that various changes may be made therein without departing from the spirit of the invention or the scope of the appended claims.

I claim:

1. In a rotary wing aircraft comprising a lift rotor and a fuselage suspended pendulously therebelow by means of rotor mast means positionally integral with said fuselage and pivotally connected to said rotor, a gyroscope including stabilized indicating means providing a visual reference plane substantially independent of movements of said fuselage, and rotor plane visual indicating means associated with said visual reference plane and mechanically connected to and actuated by said lift rotor to roll and pitch with respect to said reference plane in accordance with the tilt of said rotor plane.

2. In a rotary wing aircraft, a lift rotor and a fuselage suspended pivotally therebelow, measurement means responsive to the tilt of the path of rotation of said rotor relative to said fuselage, artificial horizon means including a member stabilized to provide a visual reference plane, and rotor plane visual representation means connected to and movable responsive to operation of said measurement means in relation to said artificial horizon stabilized member for visually indicating the tilt of said path plane relative to said reference plane.

3. In a rotary wing aircraft comprising a lift rotor and a fuselage suspended pendulously therebelow by means of rotor mast means positionally integral with said fuselage and pivotally connected to said rotor, gyroscope means including a case and a stabilized element therein establishing a reference plane substantially independent of movements of said fuselage, said case being mounted upon said fuselage for universal tilting thereon and having a glazed opening through which said stabilized element may be viewed, rotor plane attitude indicating means carried by said case for visual comparison with said reference plane, and intelligence transmission means connected to said rotor and actuated in accordance with the tilt of said rotor with respect to said fuselage and coupled to said case for tilting the latter in accord with the tilt of said rotor path with respect to said reference plane independently of movements of said fuselage.

4. In a rotary wing aircraft, a lift rotor, a fuselage, a gyro horizon including a stabilized element carried within a case, said case being mounted upon said fuselage to be universally tiltable thereon, and angular displacement detection means connected to said rotor and driven by tilting movements of said lift rotor relative to said fuselage, said detection means being coupled to said case for tilting the latter parallel to said rotor.

5. In a rotary wing aircraft comprising a lift rotor and a fuselage suspended pendulously therebelow by means of rotor mast means positionally integrall with said fuselage and pivotally connected to said rotor, a gyroscope including stabilized means providing a visual reference plane substantially independent of movements of said fuselage, and rotor plane visualization means associated with said visual reference plane, push pull means connected to said rotor to move in response to tilting of said rotor relative to said mast means, a swash plate universally pivotable upon said mast and connected to said push pull means, and link means interconnecting said swash plate and said rotor plane visualization means to cause the latter to roll and pitch in accordance with the tilt of said rotor plane.

6. In a rotary wing aircraft, a lift rotor and a fuselage suspended pivotally therebelow, measurement means connected to said rotor and responsive to the tilt of the path of rotation of said rotor relative to said fuselage, artificial horizon means including a member stabilized to provide a visual reference plane, rotor plane visual representation means associated with said stabilized member, a swash plate mounted upon said aircraft by universal pivot means and connected to said measurement means, and means interconnecting said swash plate and said rotor plane representation means to move the latter responsive to said measurement means in relation to said artificial horizon stabilized member for visually indicating the tilt of said rotor path plane relative to said reference plane.

7. In a rotary wing aircraft comprising a lift rotor and a fuselage suspended pendulously therebelow, a gyroscope including stabilized means providing a visual reference plane substantially independent of movements of said fuselage, rotor plane visualization means associated with said reference plane, push pull means connected to said rotor to move in response to tilting of the rotor relative to said fuselage, a swash plate universally pivotable upon said fuselage and connected to said push pull means, and link means interconnecting said swash plate and said rotor plane visualization means to cause the latter to roll and pitch in accordance with the tilt of said rotor plane.

References Cited in the file of this patent

UNITED STATES PATENTS

| Number | Name | Date |
|---|---|---|
| 2,427,939 | Woods | Sept. 23, 1947 |
| 2,443,192 | Moeller | June 15, 1948 |
| 2,479,549 | Ayre et al. | Aug. 23, 1949 |
| 2,529,479 | Bates | Nov. 14, 1950 |
| 2,567,212 | Klopp et al. | Sept. 11, 1951 |